(12) United States Patent
Guener et al.

(10) Patent No.: US 9,090,401 B2
(45) Date of Patent: Jul. 28, 2015

(54) CHAIN LINK COMPRISING AN ARTICULATION SECTION AND A FORK SECTION SEPARATED BY A SLIDE SECTION

(75) Inventors: Till Guener, Stuttgart (DE); Wolfram Baier, Ostfildern (DE); Peter Ludwig, Tuebingen (DE); Hans-Peter Buttau, Lauffen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/342,227

(22) PCT Filed: Aug. 10, 2012

(86) PCT No.: PCT/EP2012/065636
§ 371 (c)(1),
(2), (4) Date: Jun. 20, 2014

(87) PCT Pub. No.: WO2013/029961
PCT Pub. Date: Mar. 7, 2013

(65) Prior Publication Data
US 2014/0291127 A1 Oct. 2, 2014

(30) Foreign Application Priority Data

Sep. 3, 2011 (DE) .......................... 10 2011 112 396

(51) Int. Cl.
*B65G 17/08* (2006.01)
*B65G 17/40* (2006.01)
*B65G 15/30* (2006.01)

(52) U.S. Cl.
CPC .............. *B65G 17/086* (2013.01); *B65G 15/30* (2013.01); *B65G 17/40* (2013.01); *B65G 2201/02* (2013.01)

(58) Field of Classification Search
CPC ...... B65G 17/086; B65G 17/08; B65G 17/40; B65G 15/30

USPC .......................................... 198/852
See application file for complete search history.

(56) References Cited

U.S. PATENT DOCUMENTS 4,895,248 A * 1/1990 Wahren .......................... 198/852
5,257,690 A * 11/1993 Dehne ............................ 198/500
(Continued)

FOREIGN PATENT DOCUMENTS

DE     100 27 229 A1   12/2001
EP     0 083 119 A1    7/1983
(Continued)

OTHER PUBLICATIONS

International Search Report corresponding to PCT Application No. PCT/EP2012/065636, mailed Oct. 17, 2012 (German and English language document) (8 pages).

*Primary Examiner* — Leslie A Nicholson, III
*Assistant Examiner* — Keith R Campbell
(74) *Attorney, Agent, or Firm* — Maginot, Moore & Beck LLP

(57) ABSTRACT

A chain link for a curved conveyor chain, the chain link comprising a base body and a bolt, the base body having an articulation section and a fork section and a carrier means for carrying material that is to be conveyed, the bolt being elongated and designed in a circular cylindrical manner in at least one central section. In the articulation section, a bolt opening is provided through which the bolt can pass and can rotate relative to at least two axes. The fork section has an articulation recess for receiving the articulation section of an adjoining identical chain link, the fork section having two opposite bolt recesses which can receive the opposite ends of the bolt of the adjoining chain link. The articulation and fork sections of two adjoining, identical chain links are maintained at a distance by two slide sections.

9 Claims, 3 Drawing Sheets

(56) References Cited

U.S. PATENT DOCUMENTS

| | | | |
|---|---|---|---|
| 5,402,880 A * | 4/1995 | Murphy | 198/852 |
| 5,803,236 A * | 9/1998 | Wahren | 198/852 |
| 6,079,552 A * | 6/2000 | Reichert et al. | 198/852 |
| 6,173,832 B1 * | 1/2001 | Cockayne | 198/852 |
| 2013/0264177 A1 * | 10/2013 | Morris | 198/852 |

FOREIGN PATENT DOCUMENTS

| | | |
|---|---|---|
| EP | 0 323 819 A1 | 7/1989 |
| EP | 0 820 942 A1 | 1/1998 |
| EP | 0 569 071 B2 | 7/2000 |
| EP | 1 311 446 B1 | 11/2005 |
| WO | 2007/121957 A1 | 11/2007 |

* cited by examiner

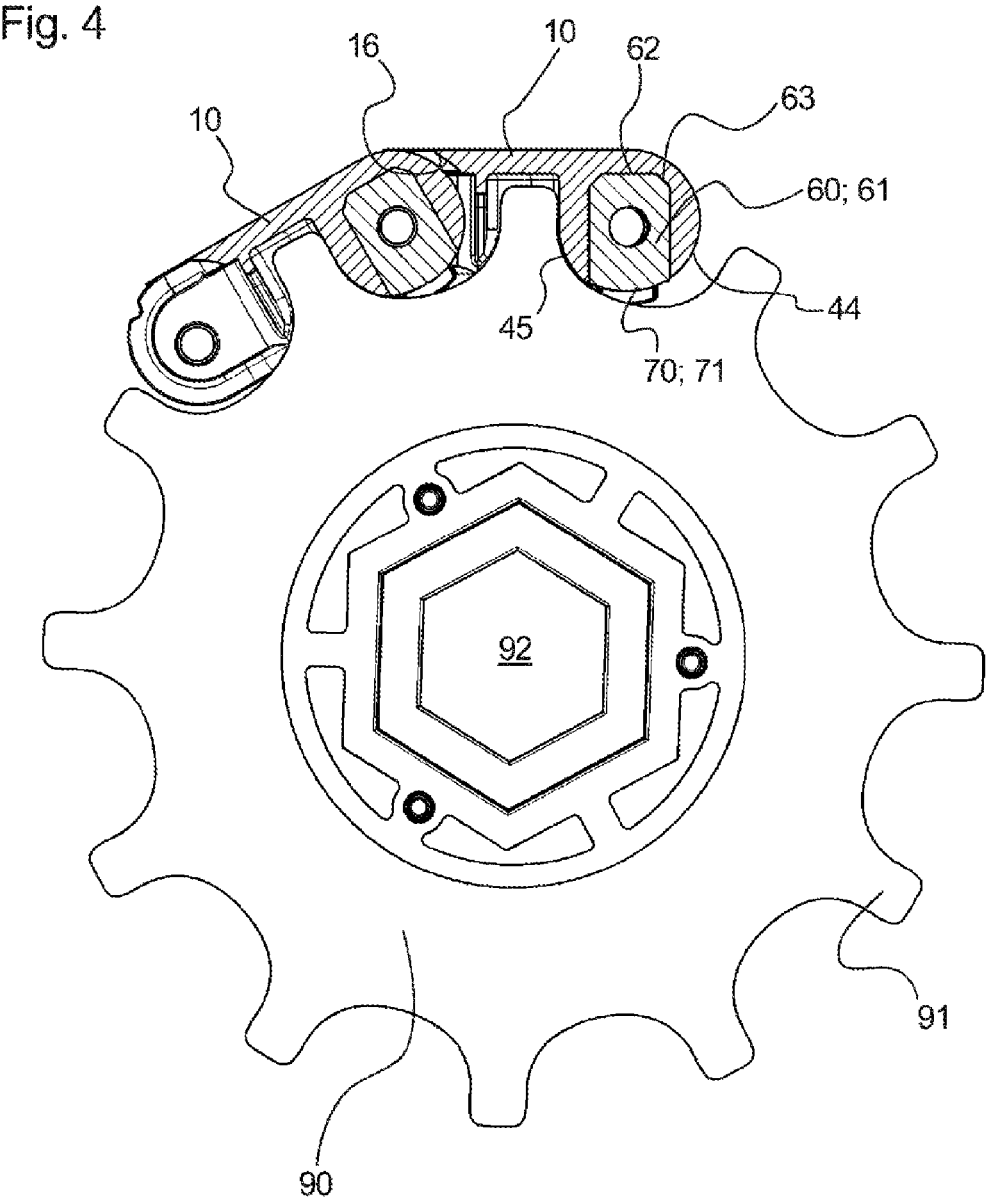

CHAIN LINK COMPRISING AN ARTICULATION SECTION AND A FORK SECTION SEPARATED BY A SLIDE SECTION

This application is a 35 U.S.C. §371 National Stage Application of PCT/EP2012/065636, filed on Aug. 10, 2012, which claims the benefit of priority to Serial No. DE 10 2011 112 396.6, filed on Sep. 3, 2011 in Germany, the disclosures of which are incorporated herein by reference in their entirety.

BACKGROUND

The disclosure relates to a chain link for a curved conveyor chain.

DE 100 27 229 A1 discloses a chain link for a curved conveyor chain. According to FIGS. 1 and 2, the chain link comprises a main body and a pin (not shown). The main body, which in this case is integral, comprises an articulation section 10 and a fork section 11. A driver means in the form of a flat supporting surface 3, by means of which material (not shown) to be conveyed can be taken along by friction, is provided on the upper side of the main body. Other driver means, e.g. catches, fins or brushes projecting vertically from the supporting surface, are also known as substitutes for the flat supporting surface. A multi-part main body is often provided in combination with the last-mentioned driver means.

The pin is of elongate design, being of circular cylindrical design over the entire length. In the articulation section a pin opening 9 is provided through which the pin passes in a manner which allows it to rotate relative to two axes. Here, the pin opening is configured similarly to FIG. 4 in EP 0 569 071 B2, i.e. the entire pin opening is provided fully in the main body, having a minimum cross-sectional area in the center, which widens toward the two orifices, ensuring that the pin has the desired ability for rotation. EP 1 311 446 B1 discloses an alternative articulation construction, in which the pin opening is intersected by a circular cylindrical aperture, in which a special articulation part is inserted. The articulation part in turn has an opening, which is matched to the pin. The last-mentioned design of articulation can transmit significantly higher tensile chain forces than that shown in DE 100 27 229 A1.

A fork recess 7 for accommodating the articulation section of an adjacent identical chain link is provided on the fork section in DE 100 27 229 A1. Two pin apertures in the form of circular cylindrical holes are furthermore provided in the fork section, serving to accommodate the pin of the adjacent chain link. A plurality of slide sections 4 made of fiber reinforced polytetrafluoroethylene (trade name "Teflon") are furthermore provided on the main body, which is made of polyoxymethylene. The slide sections are intended to reduce the frictional forces imposed by the chain links on the chain guides.

The disadvantage of the chain link according to DE 100 27 229 A1 is that both the articulation section and the fork section are composed of the same material. During the operation of the conveyor chain, these materials rub directly against one another and produce squealing noises. This problem occurs especially with polyoxymethylene, the preferred material for the chain links of a conveyor chain. However, it can be observed in general that materials of the same kind, especially plastics, which rub against one another under load produce squealing noises owing to the stick-slip effect. One already known solution to this problem is to provide polyoxymethylene with various additives which improve its ability to slide. As a result, the tendency to generate noise is reduced. However, such materials are very expensive.

It is the object of the disclosure to reduce or completely avoid the above-described generation of noise in a low-cost manner.

SUMMARY

This object is achieved by arranging two slide sections opposite one another on the articulation section, wherein they surround the pin, wherein the main bodies of two adjacent identical chain links are held at a distance by the slide sections in such a way that the articulation and fork sections thereof touch only at the slide sections.

This excludes the possibility that the identical materials of the articulation and fork sections will touch since they are held at a distance by the slide sections. As a result, squealing noises are excluded. As regards the driver means, the aim is likewise to ensure that they do not touch. Particularly in the case of driver means which project a long way from the articulation or fork section, such as catches, fins or brushes, contact cannot be completely excluded, at least on bends, however. However, such contact is harmless since such driver means are very flexible and consequently the frictional forces which occur in the event of contact are low. Accordingly, there is no risk of noise generation if the driver means touch.

As regards the spatial extent of the sections composed of a different material from the main body, it should be noted that these can, of course, be significantly larger than the slide sections per se. In particular, consideration may be given to the entire articulation section being composed of a different material from the fork section. In the context of the present application, the slide section should be taken to mean the region in which the articulation section and the fork section can enter into sliding contact during the operation of the conveyor chain.

Advantageous developments and improvements of the disclosure are indicated in the dependent claims.

The material of the main body and of the slide section can in each case be one of the materials polyoxymethylene (POM), polybutylene terephthalate (PBT), polyamide (PA), polypropylene (PP), polyethylene (PE), polybutylene succinate (PBS), polyvinylidene fluoride (PVDF), polycarbonate (PC) or polyethylene terephthalate (PET), wherein the main body is preferably composed of polyoxymethylene and the slide sections are preferably composed of polyamide. All the materials mentioned are suitable for the injection molding of plastics and offer sufficient strength and wear resistance for use in a conveyor chain link. The materials mentioned can be provided with additives and/or with fiber reinforcement.

The main body is preferably composed of polyoxymethylene. This material has the required mechanical properties for a conveyor chain link and, at the same time, is low-cost. Moreover, this material has long proven itself for this use. Tests by the applicant have shown that polyamide is particularly suitable as a material for the slide sections if the main body is composed of polyoxymethylene.

The articulation section can have a bearing aperture having a circular cylindrical inner circumferential surface, which intersects the pin opening, wherein an articulation part is provided with a bearing section, wherein the bearing section has a circular cylindrical outer circumferential surface and is accommodated rotatably in the bearing aperture, wherein the bearing section has a circular cylindrical first opening, which extends transversely to the circular cylindrical outer circumferential surface thereof, wherein the slide sections are formed integrally on the articulation part. The articulation part can be produced from a different material overall than the main body, thus enabling each part to be produced independently at low cost, preferably by the injection molding of plastics. At the same time, the chain link proposed can transmit particularly high tensile chain forces.

The slide sections can each have a second circular cylindrical opening, which is arranged in alignment with the first opening. The second opening allows the pin to be passed through to enable the latter to engage in the fork section of the adjacent chain link. Moreover, the position of the slide section in the gap between the articulation section and the slide section is defined in a reliable positive manner by the pin. For this purpose, the second opening is preferably matched to the pin with a small clearance.

Each slide section can be assigned a connecting section, which connects the slide section integrally to the bearing section, wherein the connecting section rests in a sliding manner on the articulation section of the main body or is arranged at a slight spacing with respect to said body. The bearing section of the articulation part is separated from the slide section by the articulation section over virtually its entire extent. By means of a connecting section which is arranged in the immediate vicinity of or in sliding contact with the articulation section, it is nevertheless possible to connect the slide section integrally to the bearing section. It should be noted here that, as proposed above, the bearing section can be secured in terms of position already by means of the pin. Thus, the connecting section primarily ensures that the slide section does not twist relative to the pin, and therefore a thin-walled connecting section is fully sufficient.

A recess having a convexly curved bottom surface can be provided between the connecting sections in the region of an end face of the bearing section, said recess extending transversely to the pin over the entire width of the bearing section. Said recess ensures that the engagement of a driving sprocket into the articulation section of the chain link is not obstructed by the connecting section. Consequently, power transmission from the driving sprocket takes place virtually exclusively between the articulation section and the teeth of the driving sprocket. Consequently, the articulation part cannot be damaged by the corresponding driving forces.

On the side facing the bearing section, the slide section can have a circular cylindrical first surface coaxial with the bearing section, which surface rests on a matching second surface on the articulation section. As a result, the slide section rests over the full surface on the articulation section and, at the same time, a desired rotatability between adjacent chain links is possible. During this process, sliding movements take place between the first and second surfaces. The ensuing wear is low by virtue of the full-surface contact.

The slide section can have a flat third surface on the side facing away from the bearing section, wherein the opposite fourth surface on the fork section is likewise of flat design. In relation to the fork section of the adjacent chain link, the slide section can and should rotate only relative to the center line of the pin. This movement is made possible by said flat third and fourth surfaces, and any other movement is excluded. The third and fourth surfaces are preferably arranged perpendicular to the center line of the circular cylindrical section of the pin. The spacing between the first and third surfaces determines the spacing between the articulation section and the fork section of two adjacent chain links.

A guide bevel can be arranged on the slide section, adjoining the third surface. The spacing of the third surface on the sliding part is at most slightly less than the spacing of the fourth surface on the fork section. The guide bevel proposed facilitates the introduction of the articulation section by means of the articulation part into the fork section of the adjacent chain link during the assembly of the conveyor chain.

The slide sections can also be connected securely to the articulation section or to the fork section. Here, consideration is given, in particular, to producing the corresponding main body by two-component injection molding. In this case, a first part comprising both slide sections is preferably produced by injection molding. This first part is placed in the second injection mold for the finished main body and is then overmolded with a viscous plastic composition. In this way, the slide sections are secured positively and permanently on the rest of the main body composed of a different material. However, it should be noted here that producing a chain link of this kind is more expensive than producing a chain link in which the slide sections are formed integrally on the articulation part.

BRIEF DESCRIPTION OF THE DRAWINGS

The disclosure is explained in greater detail below by means of the attached drawings, in which:

FIG. 4 shows a side view of a driving sprocket which is in engagement with a conveyor chain consisting of chain links in accordance with FIG. 1.

DETAILED DESCRIPTION

Figure 1:
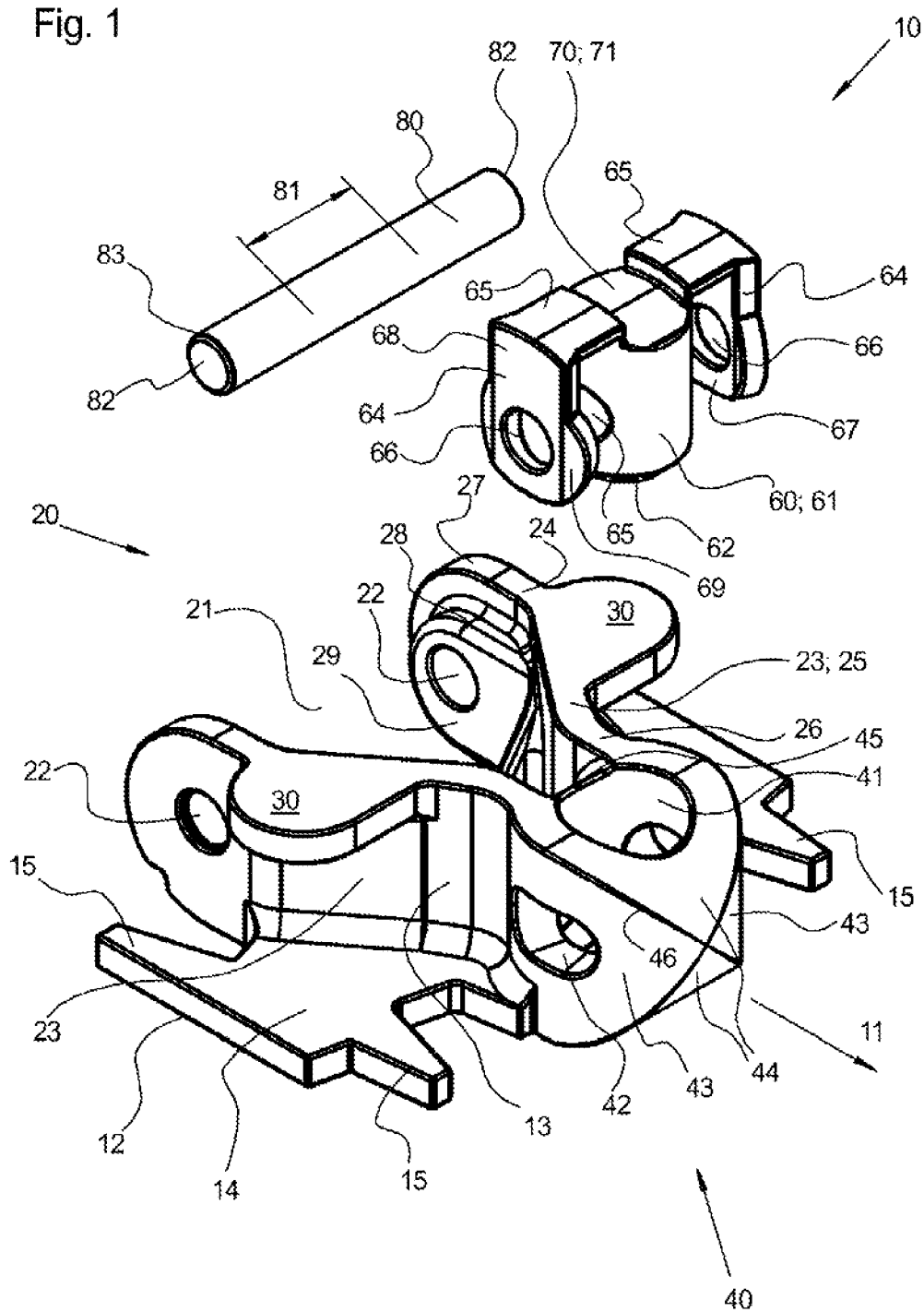
FIG. 1 shows an exploded view of a chain link according to the disclosure.

FIG. 1 shows an exploded view of a chain link 10 according to the disclosure. The chain link 10 comprises an integral main body 13 made of polyoxymethylene, an integral articulation part 60 made of polyamide, and a pin 80 made of steel. The main body 13 and the articulation part 60 are each produced by injection molding of plastics.

The main body 13, which is mirror-symmetrical overall, comprises an articulation section 40, a fork section 20 and a driver means 14. The driver means is in the form of a flat plate, which defines a conveying plane 12. The flat plate 14 is provided with teeth 15 pointing in the conveying direction 11, with the result that the teeth 15 of adjacent main bodies 13 of a conveyor chain engage in one another to ensure that the material (not shown) to be conveyed is supported as far as possible over the full surface, even on bends. The flat plate 14 is arranged so close to the articulation section 40 and the fork section 20 that it contributes to the transmission of the tensile forces in the conveyor chain.

The fork section 20 comprises two fork arms 23, which together delimit an articulation recess 21, which is provided to accommodate the articulation section 40 of an adjacent identical chain link. The fork arms 23 project vertically from the flat plate 14 and are rounded 27 in a semicircle at their end face pointing in the conveying direction 11. Arranged at the center of the rounding 27 is a pin aperture 22 in the form of a circular cylindrical opening, in which the pin 80 is accommodated with slight play. In this case, the pin 80 is of circular cylindrical design over its entire length, wherein it is provided at both ends with a flat end face 82, which has a chamfer 83 at the edge. The fork arms 23 each have a substantially Z-shaped profile with a first and a third section 24; 26 which extend parallel to the conveying direction 11 of the conveyor chain, wherein the intervening second section 25 slopes relative to the conveying direction 11. The fork arms 23 each have a substantially constant wall thickness to ensure that they are not distorted during injection molding. The height of the fork arms 23 is furthermore constant to ensure that the lower boundary surface of the main body 13 is substantially flat. Around the pin aperture 22, the fork arm 23 is provided with a reinforcement 28 to ensure that the compressive stresses in the pin aperture 22 caused by chain tension do not become impermissibly large. A driving tongue 30 is arranged on both second sections 25 of the fork arms on the side remote from the flat plate 14. The driving tongue 30 extends parallel to the flat plate 14 and transversely to the conveying direction 11, and is rounded in a semicircle on its front face. The driving tongue 30 is intended for engagement with a driving sprocket (not shown), which deflects the conveyor chain in a plane parallel to the conveying plane 12.

The fork arms 23 merge integrally into the articulation section 40. The articulation section 40 has a second surface 43, which is of circular cylindrical design and is aligned perpendicularly to the conveying plane 12. A fifth surface 44 is furthermore provided, said surface being of circular cylindrical design and extending parallel to the conveying plane 12. The circle radii of the second and fifth surfaces 43; 44 are the same, and therefore the intersecting edges 46 thereof intersect at an angle of 90°. A bearing aperture 41 having a circular cylindrical inner circumferential surface is provided concentrically with the fourth surface, said aperture being in the form of a blind hole, with the result that it does not pierce the flat plate 14. Arranged transversely to the bearing aperture 41 is a pin opening 42, which passes through the entire articulation section 40, intersecting the bearing opening 41. The pin opening 42 is traversed by the pin 80, wherein the pin 80 is rotatable relative to the center line of the bearing aperture 41. The pin opening 42 is therefore in the form of an elongate hole which extends parallel to the conveying plane 12 in order to allow said rotatability.

The articulation part 60 is of mirror-symmetrical design and comprises a bearing section 61, two slide sections 64 and two connecting sections 72, which connect the associated slide section 64 to the bearing section 61. The bearing section 61 is in the form of a circular cylinder, which is provided on its free end with a flat end face 62 and a chamfer 63, wherein the bearing aperture 41 is matched to this shape substantially without play. At the opposite end, the connecting sections 72 are connected integrally to the bearing section 61. The connecting sections 72 are substantially in the form of a flat rectangular plate, projecting perpendicularly from the bearing section 61. The connecting sections 72 make sliding contact with the articulation section 40 or are arranged with a slight clearance relative to the latter. Provided between the connecting sections 72 is a recess 70, which has a convexly curved bottom surface 71 that extends transversely to the pin 80 over the entire width of the bearing section 61. The radius of curvature of said bottom surface 71 is the same as the radius of curvature of the fifth surface 44, wherein said surfaces 71; 44 merge into one another without kinks and offsets as long as the conveyor chain is aligned straight.

The slide sections 64 are formed integrally with the associated connecting section 72 and project perpendicularly from the latter. The first surface 67 on the slide section, which faces the bearing section 61, is of circular cylindrical design and formed concentrically with the bearing section 61 and rests substantially without a gap and in a slidable manner on the articulation section 40 at the second surface 43, with the result that the articulation part 60 is rotatable in relation to the main body 13 relative to the center line of the bearing section 61. On the side facing away from the bearing section 61, the slide section 64 is provided with a flat third surface 68 which extends transversely to the conveying plane 12. The third surface 68 rests on the fork arms 23 of the fork section 20 at a flat fourth surface 29, with the result that the articulation part 60 can rotate relative to the associated fork section 20 only about the center line of the pin 80. On both sides of the third surface 68 in the conveying direction 11, a guide bevel 69 is provided on the slide section 64.

The bearing section 61 is provided with a first circular cylindrical opening 65, which extends transversely to the circular cylindrical outer circumferential surface thereof, wherein the two cylinder axes intersect. A second circular cylindrical opening 66 is arranged in alignment with the first opening 65 in each of the slide sections 64. The pin 80 is accommodated with an interference fit in the first opening 65 and with slight play in the second opening 66, and thus the slide section 64 surrounds the pin 80.

Figure 2:
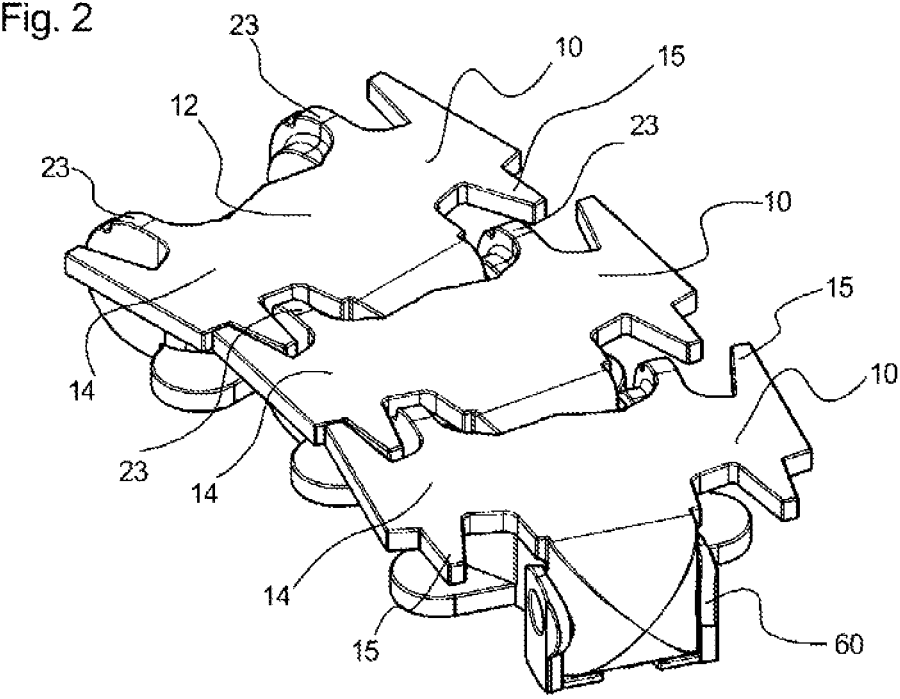
FIG. 2 shows a perspective view from above of a conveyor chain consisting of chain links in accordance with FIG. 1.

FIG. 2 shows a perspective view of a conveyor chain consisting of chain links 10 as shown in FIG. 1 from above. The conveyor chain is shown in a position as on a bend. The driver means 14 in the form of the flat plates form a conveying plane 12 insofar as the entire conveyor chain is moved in a plane. The teeth 15 of the flat plates 14 engage in one another, thus ensuring support for the material (not shown) to be conveyed substantially over the full surface, especially on the outside of the bend. Here, the bend radius is bounded at the bottom by the abutting flat plates 14 or teeth 15 on the inside of the bend, the conveyor line generally being designed in such a way that such contact does not take place.

The fork arms 23 of the fork section are arranged in such a way that they can likewise assume the function of a tooth of the flat plate 14, wherein teeth of the kind present on the chain link according to EP 1 311 446 B1,for example, have been omitted between the fork arms 23. Instead, the spacing between the flat plates of the adjacent chain links 10 has been made as small as possible at this point.

Figure 3:
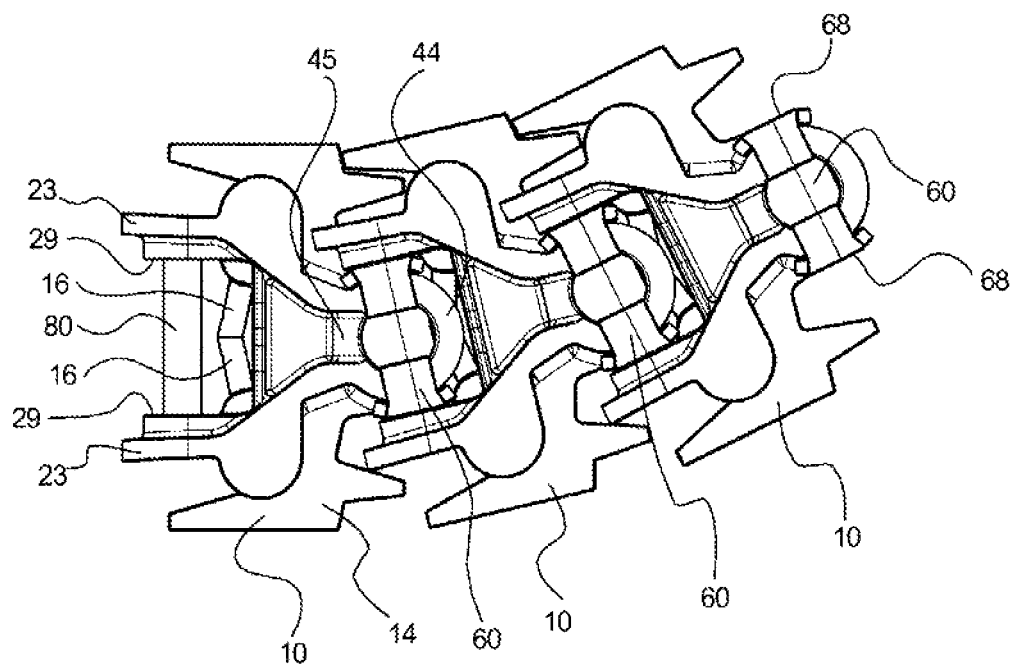
FIG. 3 shows a bottom view of a conveyor chain consisting of chain links in accordance with FIG. 1.

FIG. 3 shows a bottom view of a conveyor chain consisting of chain links 10 as shown in FIG. 1. It can be seen that the pin 80 is accommodated between the fork arms 23 of the fork section. Attention should furthermore be drawn to the sixth surface 45, which is arranged between the fork arms 23, wherein the sixth surface 45 lies on a common circular cylinder with the fifth surface 44, said cylinder being arranged parallel to the conveying plane. Attention should furthermore be drawn to the chamfers 16 on the underside of the flat plate 14. As can be seen in FIG. 4, the cross-sectional shape of the chamfer 16 is equidistant from the fifth surface 44 on the articulation section of the adjacent chain link 10, with a small clearance, with the result that the clearance of the flat plates 14 in this region is small. The alignment of the articulation parts 60 relative to the fork arms 23 on a bend can furthermore be seen in FIG. 3. In particular, attention should be drawn to the fact that the third 68 and the fourth surface 29 touch.

FIG. 4 shows a side view of a driving sprocket 90, which is in engagement with a conveyor chain consisting of chain links 10 in accordance with FIG. 1. Here, the conveyor chain is shown in longitudinal section. The conveyor chain is set in motion by means of the driving sprocket 90. The driving sprocket 90 is provided, for example, with a hexagon socket 92, by means of which it can be brought into positive rotary driving connection with an electric motor (not shown). In this case, the teeth 91 of the driving sprocket 90 engage with slight backlash between the third sections (No. 26; FIG. 1) of the fork arms of the chain link 10, resting against the sixth surface 45. If the conveyor chain is to be driven in the opposite direction, the symmetrical teeth 91 of the driving sprocket 90 engage on the fifth surface 44 of the articulation section. The already discussed recess 70 between the connecting sections of the articulation part 60 is required to ensure that the articulation part 60 does not hinder the reversal of the direction of movement of the conveyor chain.

LIST OF REFERENCE SIGNS 10 chain link
11 conveying direction
12 conveying plane
13 main body
14 driver means or flat plate
15 tooth of the flat plate
16 chamfer
20 fork section
21 articulation recess
22 pin aperture
23 fork arm
24 first section of the fork arm
25 second section of the fork arm
26 third section of the fork arm
27 rounding of the fork arm
28 reinforcement
29 fourth surface
30 driving tongue
40 articulation section
41 bearing aperture
42 pin opening
43 second surface
44 fifth surface
45 sixth surface
46 intersecting edge
60 articulation part
61 bearing section
62 end face
63 chamfer
64 slide section
65 first opening
66 second opening
67 first surface
68 third surface
69 guide bevel
70 recess of the articulation part
71 bottom surface
72 connecting section
80 pin
81 central section of the pin
82 end face of the pin
83 chamfer of the pin
90 driving sprocket
91 tooth of the driving sprocket
92 hexagon socket The invention claimed:

1. A chain link for a curved conveyor chain, comprising:
a main body including an articulation section, a fork section, and a driver structure configured to take along material to be conveyed;
a pin; and
two slide sections provided opposite one another on the articulation section,
wherein the pin defines an elongate and circular cylinder, at least in a central section,
wherein in the articulation section a pin opening is provided through which the pin can pass in a manner which allows it to rotate relative to at least two axes,
wherein the fork section has an articulation recess configured to accommodate the articulation section of an adjacent identical chain link,
wherein the bearing section and the two slide sections include
wherein the articulation section has two opposite pin apertures, which can accommodate opposite ends of the pin of the adjacent chain link,
wherein at least one slide section, which is composed of a different material from the main body, is provided on the main body,
wherein the two slide sections surround the pin,
wherein the main bodies of two adjacent identical chain links are held at a distance by the slide sections in such a way that the articulation and fork sections thereof touch only at the slide sections, and
wherein:
the articulation section includes a bearing aperture having a circular cylindrical inner circumferential surface, which intersects the pin opening;
the chain link further comprises an articulation part that includes a bearing section;
the bearing section has a circular cylindrical outer circumferential surface and is configured to be accommodated rotatably in the bearing aperture;
the bearing section has a first circular cylindrical opening which extends transversely to the circular cylindrical outer circumferential surface thereof; and
the two slide sections are formed integrally on the articulation part.

2. The chain link as claimed in claim 1, wherein the main body is composed of polyoxymethylene and the two slide sections are composed of polyamide.

3. The chain link as claimed in claim 1, wherein each of the two slide sections has a respective second circular cylindrical opening arranged in alignment with the first circular cylindrical opening.

4. The chain link as claimed in claim 1, wherein:
each slide section is assigned a respective connecting section which connects each slide section integrally to the bearing section; and
the respective connecting section rests in a sliding manner on the articulation section of the main body or is configured to be positioned at a slight spacing with respect to said main body.

5. The chain link as claimed in claim 4, wherein:
a recess having a convexly curved bottom surface is located between the respective connecting sections in a region of an end face of the bearing section; and
said recess extends transversely to the pin over an entirety of a width of the bearing section.

6. The chain link as claimed in claim 1, wherein:
on a respective side facing the bearing section, each slide section has a respective circular cylindrical first surface coaxial with the bearing section; and
the respective circular cylindrical first surface rests on a respective matching second surface on the articulation section.

7. The chain link as claimed in claim 1, wherein:
each slide section further includes a respective flat third surface on a side facing away from the bearing section; and
the fork section further includes a respective flat fourth surface opposite each flat third surface.

8. The chain link as claimed in claim 7, wherein each slide section further comprises a respective guide bevel adjoining the respective flat third surface.

9. The chain link as claimed in claim 1, wherein each slide section is connected securely to the articulation section or to the fork section.

* * * * *